Nov. 15, 1932.  L. C. HUFF  1,888,039
INTERLOCKING LINING FOR VESSELS OR RECEPTACLES
Filed July 28, 1930  2 Sheets-Sheet 1

INVENTOR
LYMAN C. HUFF
BY *Frank L. Belknap*
ATTORNEY

Nov. 15, 1932.   L. C. HUFF   1,888,039
INTERLOCKING LINING FOR VESSELS OR RECEPTACLES
Filed July 28, 1930   2 Sheets-Sheet 2

INVENTOR
LYMAN C. HUFF
BY Frank L. Belknap
ATTORNEY

Patented Nov. 15, 1932

1,888,039

UNITED STATES PATENT OFFICE

LYMAN C. HUFF, OF CHICAGO, ILLINOIS, ASSIGNOR TO UNIVERSAL OIL PRODUCTS COMPANY, OF CHICAGO, ILLINOIS, A CORPORATION OF SOUTH DAKOTA

INTERLOCKING LINING FOR VESSELS OR RECEPTACLES

Application filed July 28, 1930. Serial No. 471,153.

This invention relates to improvements in linings for vessels, and refers particularly to a novel means of disposing a refractory or non-corrosive lining, built up of a plurality of elements, upon the inner walls of a vessel or receptacle utilized to contain fluids at relatively high temperatures or fluids at relatively high, low or ordinary temperatures which have corrosive properties.
The utility, objects and advantages of my invention will be apparent from the accompanying drawings and following detail description.

In the drawings; Fig. 1 is an elevational view, parts being broken away and parts being shown in section of a vessel provided with an embodiment of my invention.

Figure 2:
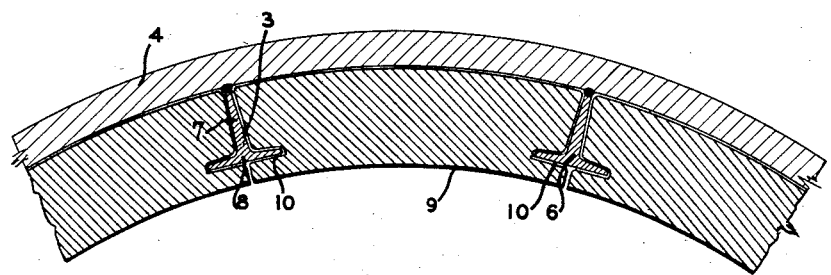
Fig. 2 is a fragmentary plan sectional view of a portion of the wall of the vessel shown in Fig. 1.

Referring in detail to the drawings, 1 indicates a vessel or receptacle which may have openings 2 at its upper and lower ends, said openings being provided with removable closures 3. The vessel 1 may comprise an outer shell 4 usually of metal, and may be utilized as a reaction chamber or a dephlegmator for use in cracking oil, or may be utilized wherever it may be desirable to confine a fluid at a relatively high temperature or a fluid which possesses corrosive properties. The vessel 1 may have provided on its inner surface a lining 5 which may be built up of a heat-resisting or non-corrosive material.

To dispose the lining 5 upon the inner surface of the shell 4 of vessel 1, I may provide a plurality of T-irons 6 having webs 7 and cross portions 8, said T-irons being welded or otherwise suitably mounted upon the inner surface of shell 4, the arrangement being such that the outer edges of the webs 7 extend inwardly towards the inner surface of shell 4 and said edges may be welded to said surfaces. By referring particularly to Figs. 1 and 2, it can readily be seen that the T-irons 6 are longitudinally disposed relative to the length of the chamber 1, and said irons are spaced circumferentially about the inner surface of the shell 4.

Blocks 9, which may be constructed of a refractory material such as fire clay, refractory tile, vitrified tile or the like, if the vessel 1 is to be used as a reaction chamber or as a dephlegmator, may be interposed between adjacent longitudinal rows of T-irons 6, said blocks being provided at their vertical edges with slots or recesses 10 which may be adapted to cooperatively interlock with the cross portions 8 of adjacently disposed T-irons. It is to be understood, of course, that my invention, inasmuch as it is not limited to oil cracking equipment or limited to vessels containing liquids at relatively high temperatures, may have blocks similar to the blocks 9 composed of any suitable material, for instance, a material which is non-corrosive, or if the vessel 1 is to contain such fluids as acids or the like, the material of which said blocks may be constructed may be of such a nature that said acids or the like will not injuriously affect them.

The crevices between adjacent blocks 9, if desired, may be filled with some form of plastic material which may possess properties of heat resistivity or may be of non-corrosive material. If the vessel 1 is to be used in connection with oil cracking or oil distilling apparatus, said blocks may loosely abut each other and in operation the crevices between said blocks may be filled with coke or tar, in which case a provision will be had for the expansion and contraction within the vessel due to variations in temperature.

When the lining 5 is to be used in vessels containing fluids of relatively high temperatures, it can readily be seen that the cross portions 8 of the T-irons 6 will become heated to a higher degree than those portions of the webs 7 adjacent the shell 4, and hence an inequality will exist in the expansion or contraction of said T-irons which may cause the T-irons to buckle or bend to such an extent that the irons may break away from the inner wall of the vessel. To prevent this occurrence, I may construct T-irons 6 in relatively short lengths and may provide a space 11 between the abutting ends of adjacent vertically disposed T-irons. By this provision the difference in expansion and contraction between the various portions of the T-irons will be substantially negligible, and if appreciable expansion does occur the abutting ends of adjacent T-irons will be prevented from contacting each other by the provision of a space 11.

Figure 1:
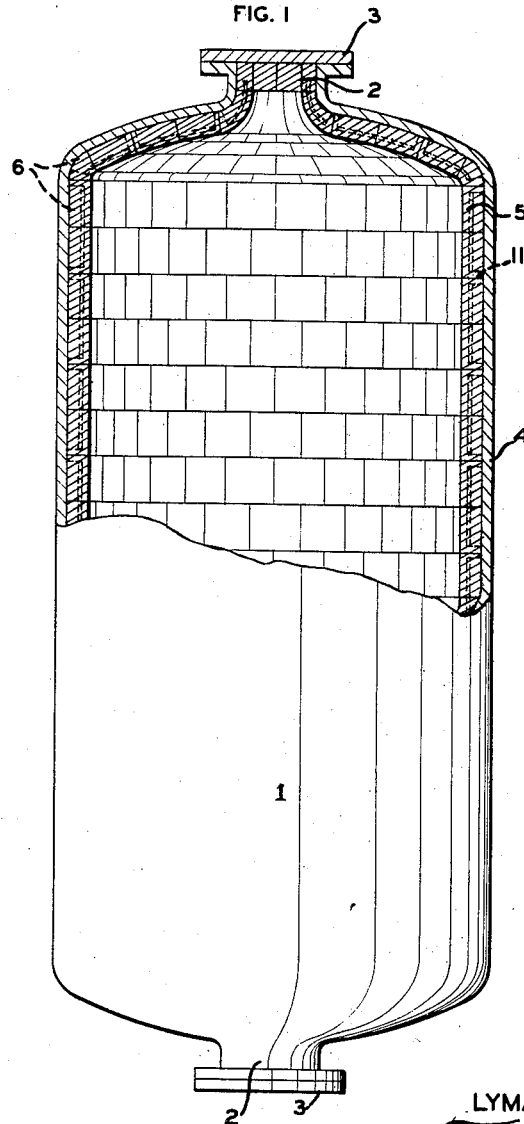
Figure 4:
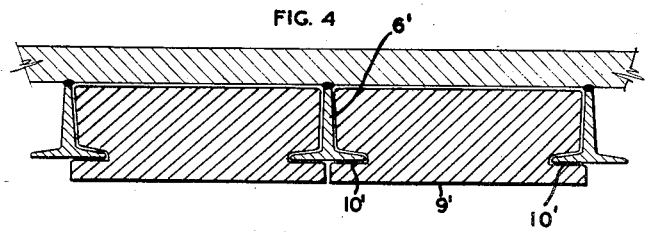
Fig. 4 is a fragmentary longitudinal sectional view of a portion of the wall of the vessel shown in Fig. 3.
Figure 3:
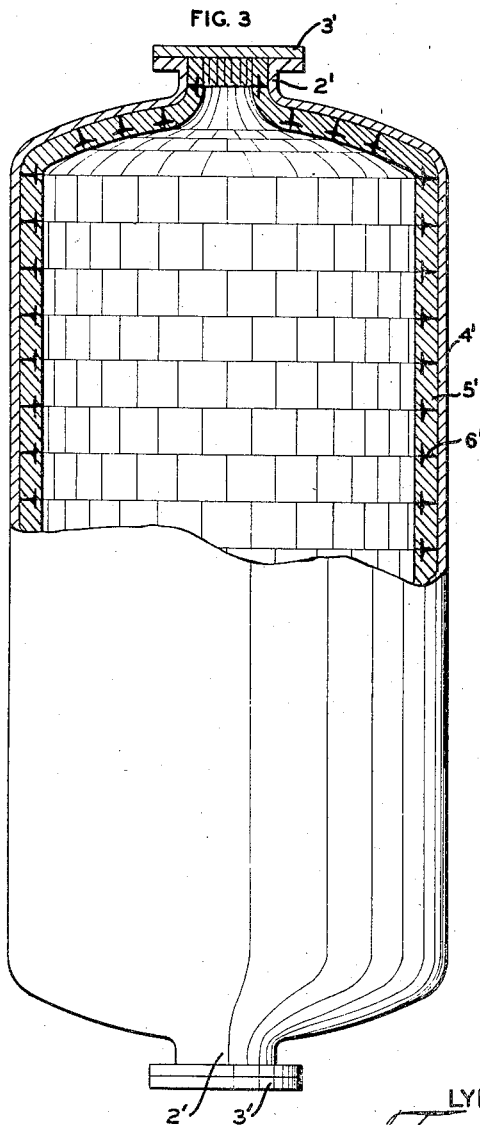
Fig. 3 is an elevational view, parts being broken away and parts being shown in section, of a slightly modified form of my invention.

Referring particularly to Figs. 3 and 4, a vessel 1' is shown having openings 2' and closures 3' similar to the openings 2 and closures 3 of the vessel 1 shown in Fig. 1. The vessel 1' may be provided with an outer shell 4' which, if desired, may be constructed of a suitable metal or the like, and may have a lining 5' disposed upon the inner surface of said shell. In this embodiment of my invention, the T-irons 6', instead of being disposed longitudinally within the vessel 1, may be disposed circumferentially upon the inner surface of the shell 4' adjacent circular rows of T-irons 6' being spaced vertically from each other. In this modification of my invention when mounting blocks 9' between adjacent T-irons 6', said blocks may be provided with slots or recesses 10' in their opposite horizontal edges. The T-irons 6' may be constructed in relatively short lengths, and spaces (not shown in Figs. 3 or 4) similar to the spaces 11 shown in Fig. 1 may be provided between the abutting ends of adjacent circumferentially disposed T-irons. Hence, unequal expansion or contraction of said irons will be compensated.

I am aware that many modifications of my invention may be constructed without departing from the spirit thereof. For instance, the sections of the supporting structural irons may be varied and may take the form for example, of I-beams, angle irons, or the like, in which case corresponding slots will be provided in the tile or blocks interposed between adjacent rows of irons. Other modifications may suggest themselves to those skilled in the art, which modifications may also be contemplated by my invention, hence I do not wish to be limited except as necessitated by the prior art.

By the term "resistant" or "resistant lining" as used in the specification and claims, is meant a lining constructed of a material which may be heat resisting, acid resisting, water resisting, corrosion resisting or the like, each case depending upon the properties of the liquid or fluid, or the physical or chemical state of the liquid or fluid against which a surface of non-resistant material is to be protected. Likewise, by the expression "non-resistant" is meant that character or property of a material which when exposed to certain predetermined fluids or fluids in a peculiar physical or chemical state affect that material destructively or disadvantageously.

I claim as my invention:

1. A resistant lining for a non-resistant surface comprising a plurality of resistant blocks having recesses formed in opposite edges, a plurality of elements extending outwardly from said surface, and projections upon said elements which register with the recesses provided in said blocks.

2. In combination, a vessel comprising a shell and a lining disposed upon the inner portion of said shell comprising a plurality of adjacently disposed resistant blocks and means for maintaining said blocks in interlocked relation upon the inner portion of said shell.

3. In combination, a vessel comprising a shell and a lining disposed upon the inner portion or said shell comprising a plurality of adjacently disposed resistant blocks and means for maintaining said blocks in adjacent position with respect to the inner portion of said shell comprising a plurality of elements fastened at one edge to the inner portion of the shell, the outer portion of said elements having extended sections, said blocks being provided with slots into which said extended sections register.

4. In combination, a refractory lining for a vessel or receptacle comprising a plurality of refractory blocks having recesses formed in opposite edges, a plurality of structural iron members extending outwardly from the inner walls of said vessel, and projections upon said structural iron members which register with the recesses in said blocks.

5. In combination, a refractory lining for a vessel or receptacle containing fluid at relatively high temperatures comprising a plurality of refractory blocks having recesses formed in opposite edges, a plurality of relatively short structural iron members extending outwardly from the inner walls of said vessel, and projections upon said members which register with the recesses in said blocks.

6. In combination, a refractory lining for a vessel or receptacle containing fluids at relatively high temperatures comprising a plurality of refractory blocks having recesses formed in opposite edges, a plurality of relatively short structural iron members extending outwardly from the inner walls of said vessel, said members being spaced longitudinally and transversely from each other and projections upon said members which register with the recesses in said blocks.

7. In combination, a refractory lining for a vessel or receptacle containing fluids at relatively high temperatures comprising a plurality of refractory blocks having recesses formed in opposite edges, a plurality of relatively short structural iron members longitudinally disposed upon the inner walls of said vessel, said members being spaced longitudinally and transversely from each other, and projections upon said members which register with the recesses in said blocks.

8. In combination, a refractory lining for a vessel or receptacle containing fluids at relatively high temperatures comprising a plurality of refractory blocks having recesses formed in opposite edges, a plurality of relatively short structural iron members transversely disposed upon the inner walls of said vessel, said members being spaced longitudinally and transversely from each other, and projections upon said members which register with the recesses in said blocks.

In testimony whereof I affix my signature.

LYMAN C. HUFF.